(12) United States Patent
Suzuki

(10) Patent No.: US 8,534,702 B2
(45) Date of Patent: Sep. 17, 2013

(54) SIDE AIR BAG DEVICE, OCCUPANT PROTECTION DEVICE AND OCCUPANT PROTECTION METHOD

(75) Inventor: Mototsugu Suzuki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 13/410,457

(22) Filed: Mar. 2, 2012

(65) Prior Publication Data
US 2012/0235389 A1 Sep. 20, 2012

(30) Foreign Application Priority Data
Mar. 17, 2011 (JP) ................................ 2011-059301

(51) Int. Cl.
*B60R 21/16* (2006.01)
(52) U.S. Cl.
USPC ...................................................... 280/730.2
(58) Field of Classification Search
USPC .......................................................... 280/730.2
See application file for complete search history.

(56) References Cited

U.S. PATENT DOCUMENTS

| | | | | |
|---|---|---|---|---|
| 6,666,475 B2 * | 12/2003 | Kippschull | ................ | 280/730.2 |
| 7,793,973 B2 * | 9/2010 | Sato et al. | ................ | 280/730.2 |
| 7,793,977 B2 * | 9/2010 | Sato et al. | ................ | 280/743.2 |
| 7,926,838 B2 * | 4/2011 | Honda et al. | ................ | 280/729 |
| 7,946,616 B2 * | 5/2011 | Ochiai et al. | ................ | 280/730.2 |
| 2012/0217731 A1 * | 8/2012 | Baba et al. | ................ | 280/730.2 |

FOREIGN PATENT DOCUMENTS

JP 2007-50847 3/2007

* cited by examiner

*Primary Examiner* — Faye M. Fleming
(74) *Attorney, Agent, or Firm* — Smith, Gambrell & Russell, LLP

(57) ABSTRACT

There are provided a side air bag device, an occupant protection device and an occupant protection method. The side air bag member is expanded between a side door and a passenger M in a widthwise direction of a vehicle so as to protect the passenger from a shock caused by an impact on the side door. The side air bag member includes a communication chamber and a non-expanded portion that are contracted when the side air bag member is pressed by a curtain air bag member that is expanded above the side air bag member in the vertical direction of the vehicle.

17 Claims, 4 Drawing Sheets

SIDE AIR BAG DEVICE, OCCUPANT PROTECTION DEVICE AND OCCUPANT PROTECTION METHOD

CROSS-REFERENCE TO RELATED APPLICATIONS

The present application claims priority from Japanese Patent Application No. 2011-059301 filed on Mar. 17, 2011, the entire contents of which are hereby incorporated by reference.

BACKGROUND OF THE INVENTION

1. Field of the Invention

The present invention relates to a side air bag device, an occupant protection device and an occupant protection method capable of protecting a passenger from a shock caused by a side impact on a side wall of a vehicle (hereinafter merely referred to as a side impact) by expanding a side air bag member between a passenger on a vehicle seat and the side wall of the vehicle, and more particularly, to a side air bag device, an occupant protection device, and an occupant protection method capable of preventing an interference with a head protective air bag member (hereinafter referred to as a curtain air bag member).

2. Description of Related Art

There has conventionally been known a side air bag device that expands a side air bag member between a passenger and a side wall of a vehicle (hereinafter referred to as a side door) so as to cover a door trim of the side door, during a side impact, thereby protecting mainly a shoulder, chest, and waist of the passenger from the side impact.

There has also been known an occupant protection device and an occupant protection method provided with the side air bag device and a curtain air bag device. Specifically, in the occupant protection device and the occupant protection method described above, the curtain air bag device expands a curtain air bag member between the passenger and the side door, during the side impact, so as to cover a window glass of the side door, thereby being capable of mainly protecting a head of the passenger from the side impact.

In order to not only protect the shoulder or the head of the passenger but also prevent the passenger from being thrown from the vehicle, an occupant protection device and an occupant protection method described below have been demanded for increasing safety to a side impact. Specifically, it has been demanded that a curtain air bag member is expanded below a door belt of the side door that is the boundary between the window glass and the door trim (i.e., the occupant protection device and occupant protection method capable of dealing with a so-called rollover have been demanded).

The occupant protection device and the occupant protection method have a problem of interference between the side air bag member and the curtain air bag member, since the curtain air bag member is expanded below the door belt.

In other words, the occupant protection device and the occupant protection method have a technical problem that an appropriate expansion and development of each member may be hindered due to the interference between the curtain air bag member and the side air bag member.

In order to prevent the interference between the curtain air bag member and the side air bag member for securing the appropriate expansion and development of each member, it is considered that the size of the side air bag member in the vertical direction of the vehicle is set to be short.

However, if the size of the side air bag member in the vertical direction of the vehicle is set to be short, there is a possibility that the shoulder of the passenger, which is to be protected by the side air bag member, cannot be protected.

In view of this, Japanese Patent Application Laid-Open (JP-A) No. 2007-050847 discloses, as a device capable of preventing the interference between the curtain air bag member and the side air bag member, a side impact air bag device in which a shoulder protective bag portion of a side air bag falls down toward a compartment in the widthwise direction of the vehicle, whereby an appropriate expansion of a head protective bag can be secured, when the side air bag and the head protective air bag interfere with each other.

In JP-A No. 2007-050847 described above, the shoulder protective bag portion of the side air bag member is pressed by the curtain air bag member for allowing the side air bag member to fall down toward the compartment in the widthwise direction of the vehicle in order to secure the appropriate expansion and development of the head protective bag (corresponding to the curtain air bag member) as described above.

Specifically, in JP-A No. 2007-050847, the side air bag member itself does not avoid the curtain air bag member, so that the expansion direction of the side air bag member is not constant. Accordingly, in JP-A No. 2007-050847, the expansion of the side air bag member in the appropriate direction may be inhibited, that is, the shoulder protective bag portion of the side air bag member may be fallen down to the outside in the widthwise direction of the vehicle.

In JP-A No. 2007-050847, a reaction force is generated because the side air bag member is pressed by the curtain air bag member. The side air bag member repels the curtain air bag member by the reaction force, which may inhibit the expansion of the curtain air bag member in the appropriate direction.

In JP-A No. 2007-050847, the side air bag member may be cured since the side air bag member is pressed by the curtain air bag member, resulting in that an injury level of a passenger may be increased.

As described above, the technique described in JP-A No. 2007-050847 has room for improvement for surely securing the appropriate expansion of the side air bag member and the curtain air bag member. Accordingly, the technique described in JP-A No. 2007-050847 has room for improvement for increasing safety to a side impact.

SUMMARY OF THE INVENTION

An object of the present invention is, in view of the above-mentioned conventional circumstance, to provide a side air bag device, an occupant protection device and an occupant protection method that can surely secure an appropriate expansion of a side air bag member and a curtain air bag member by easing, with the side air bag member, a pressing force caused by the curtain air bag member, thereby increasing safety to a side impact.

In order to solve the problem described above, an aspect of the present invention provides a side air bag device that expands a side air bag member between a passenger and a vehicle side wall in a widthwise direction of the vehicle for protecting the passenger from a shock caused by an impact on the vehicle side wall. The side air bag member includes a contraction portion that is contracted when the side air bag member is pressed by a head protective air bag member, which expands above the side air bag member in the vertical direction of the vehicle.

Preferably, the side air bag member of the side air bag device should have plural chambers including at least a first chamber located at an upper part in the vertical direction of the vehicle and a second chamber located at a lower part in the vertical direction of the vehicle, wherein the contraction portion of the side air bag member is arranged between the first chamber and the second chamber in the vertical direction of the vehicle, and includes a communication chamber that can communicate the first and second chambers, and a shield portion that shields the first and second chambers.

Preferably, the shield portion of the side air bag device should have a predetermined length in the vertical direction and longitudinal direction of the vehicle.

Preferably, the side air bag member of the side air bag device should have a narrowed portion formed on a part of an outer peripheral surface of the communication chamber along the vertical direction of the vehicle.

Preferably, the side air bag member of the side air bag device should have a vent hole formed on the first chamber.

Preferably, the side air bag member of the side air bag device according to the present invention should have a vent hole formed on a front part from the contraction portion in the longitudinal direction of the vehicle.

Preferably, the side air bag member of the side air bag device should have a vent hole formed in the vicinity of the shield portion and at the outer side in the widthwise direction of the vehicle.

In order to solve the above-mentioned problem, another an occupant protection device according to the present invention expands a side air bag member and a head protective bag member between a vehicle side wall and a passenger in a widthwise direction of a vehicle so as to protect the passenger from a shock caused by a side impact on the vehicle side wall, wherein the side air bag member includes a contraction portion that is contracted with a pressing force of the head protective bag member.

In order to solve the above-mentioned problem, another aspect of the present invention provides an occupant protection method that expands a side air bag member and a head protective bag member between a vehicle side wall and a passenger so as to protect the passenger in a widthwise direction of a vehicle from a shock caused by a side impact on the vehicle side wall. The side air bag member is displaced in the vertical direction of the vehicle by being pressed by the head protective bag member.

DETAILED DESCRIPTION OF THE PREFERRED EMBODIMENTS

Figure 1:
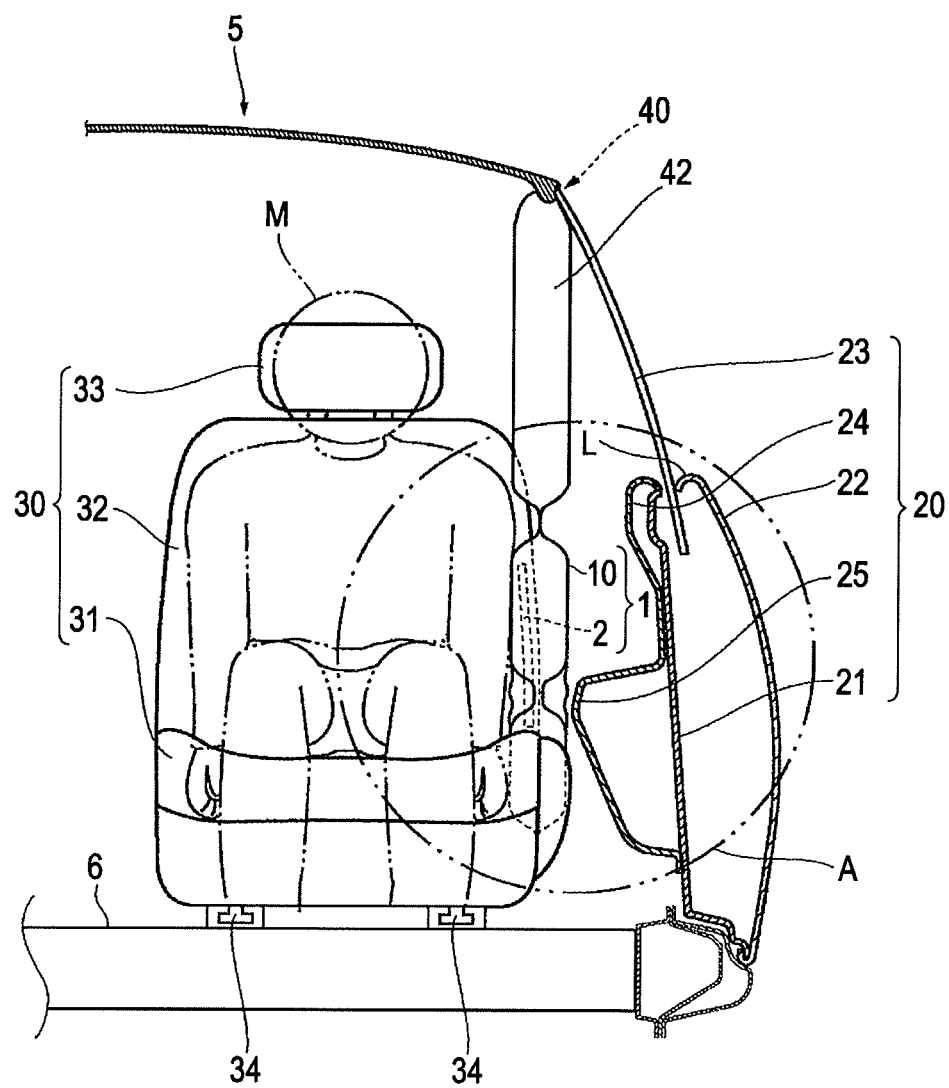
FIG. 1 is a front view schematically illustrating a configuration of a side air bag device and an occupant protection device provided with the side air bag device, according to one embodiment of the present invention, from front in the longitudinal direction of a vehicle, wherein a side air bag member and a curtain air bag member of the occupant protection device are expanded.

An embodiment of the present invention will be explained in detail below with reference to the drawings. An occupant protection device according to the embodiment expands a side air bag member 10 and a curtain air bag member (head protective air bag member) 42 between a side door (vehicle side wall) 20 in a widthwise direction of the vehicle and a passenger M on a vehicle seat 30 for protecting the passenger M from a shock caused by a side impact on the side door 20.

Further, an occupant protection method according to the present embodiment expands the side air bag member 10 and the curtain air bag member 42 between the side door 20 and the passenger M on the vehicle seat 30 for protecting the passenger M from a shock caused by a side impact on the side door 20.

Specifically, a side air bag device 1 including the side air bag member 10 and a curtain air bag device 40 including the curtain air bag member 42 correspond to the occupant protection device. A method of protecting the passenger M by the side air bag device 1 and the curtain air bag device 40 according to the embodiment corresponds to an occupant protection method.

Further, the side door 20 and the vehicle seat 30 of the vehicle 5 to which the occupant protection device according to one embodiment of the present invention is applied will be described with reference to FIGS. 1 and 2. FIG. 1 is a front view schematically illustrating the configuration of the side air bag device 1 and the occupant protection device provided with the side air bag device 1, according to one embodiment of the present invention, from front in the longitudinal direction of the vehicle, wherein the side air bag member 10 and the curtain air bag member 42 of the occupant protection device are expanded.

Figure 2:
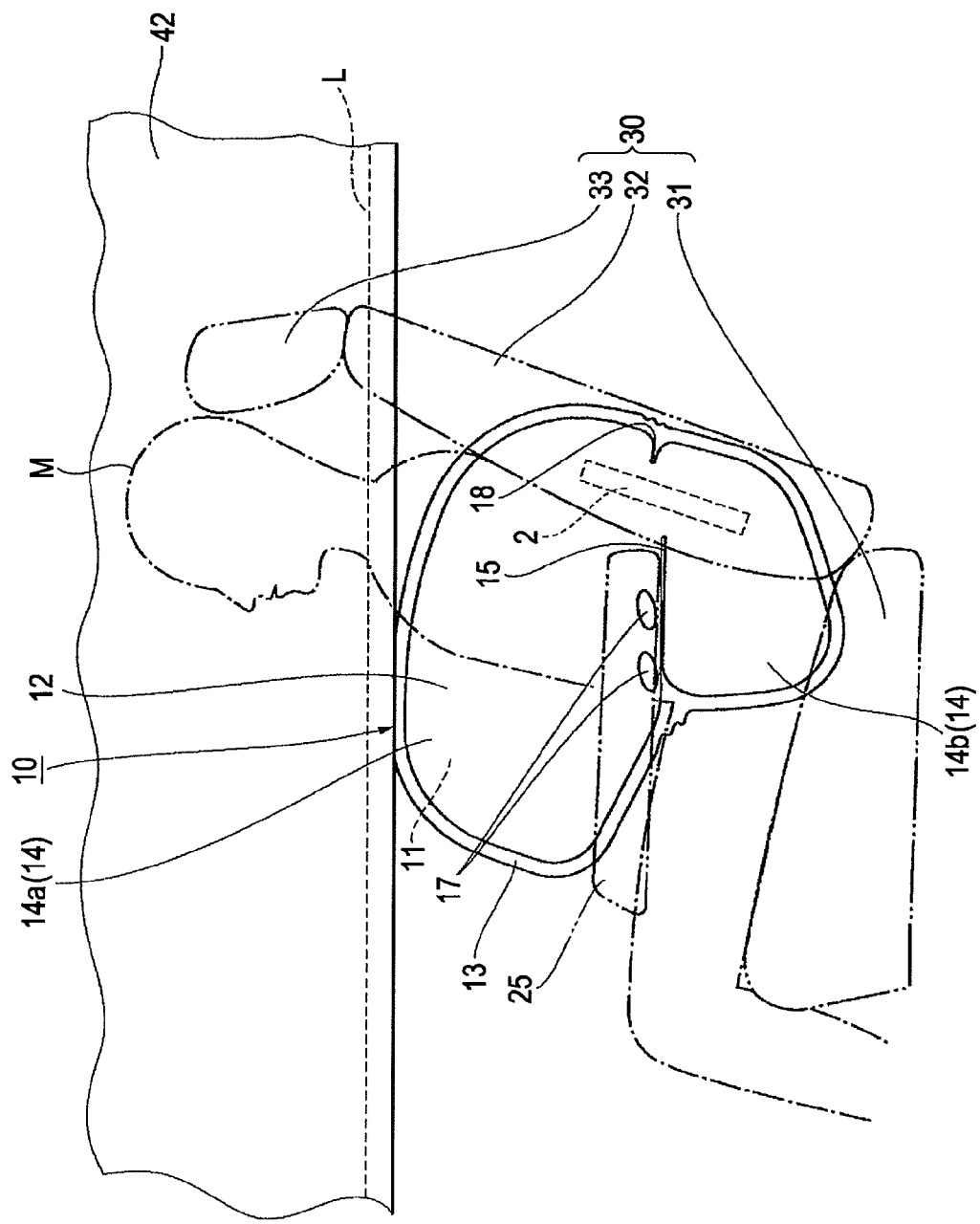
FIG. 2 is a left side view schematically illustrating the configuration of the side air bag device and the occupant protection device provided with the side air bag device, according to one embodiment of the present invention, from a left side in the widthwise direction of the vehicle, wherein the side air bag member and the curtain air bag member of the occupant protection device are expanded.

Further, FIG. 2 is a left side view schematically illustrating the configuration of the side air bag device 1 and the occupant protection device provided with the side air bag device 1, according to one embodiment of the present invention, from the left side in the widthwise direction of the vehicle, wherein the side air bag member 10 and the curtain air bag member 42 of the occupant protection device are expanded.

As illustrated in FIGS. 1 and 2, the side door 20 according to the embodiment includes an inner panel 21 and an outer panel 22, which constitute a frame of the side door 20.

Further, the side door 20 also includes a window glass 23 that is provided between the inner panel 21 and the outer panel 22 and that can move up and down in the vertical direction of the vehicle between the inner panel 21 and the outer panel 22.

In addition, a door trim 24 is mounted to the inner panel 21, which constitutes the side door 20, near the compartment in the widthwise direction of the vehicle. A door armrest 25 that projects toward the compartment in the widthwise direction of the vehicle is mounted to the door trim 24. The vehicle seat 30 on which the passenger M sits is provided near the door armrest 25 in the compartment in the widthwise direction of the vehicle.

The vehicle seat 30 includes a seat cushion 31 on which the passenger M sits, and a seat back 32 that is arranged at a trailing end of the seat cushion 31 in the longitudinal direction of the vehicle for allowing the passenger M to lean thereon. The vehicle seat 30 includes a head restraint 33 at the upper end of the seat back 32 in the vertical direction of the vehicle.

The seat cushion 31 constituting the vehicle seat 30 is mounted on a floor 6 of the vehicle 5 in order to be slidable in the longitudinal direction of the vehicle through a slide mechanism 34. Therefore, when the passenger M utilizes the vehicle seat 30, the passenger M can slide the vehicle seat 30 according to a taste of the passenger M in the longitudinal direction of the vehicle. The seat back 32 is mounted at the trailing end of the seat cushion 31 in the longitudinal direction of the vehicle as described above.

The seat back 32 is mounted to the seat cushion 31 through an unillustrated reclining mechanism. Therefore, when the passenger M utilizes the vehicle seat 30, the passenger M can stand or recline the seat back 32 according to a taste of the passenger M in the longitudinal direction of the vehicle.

The side air bag device 1 is mounted to the seat back 32 near the side door 20 in the widthwise direction of the vehicle. The side air bag device 1 expands the side air bag member 10 toward the front from the seat back 32 in the longitudinal direction of the vehicle.

The side air bag device 1 is mounted to the seat back 32 as described above. However, the invention is not limited thereto. For example, the side air bag device 1 may be mounted to the seat cushion 31 near the side door 20. In this case, the side air bag device 1 expands the side air bag member 10 upward in the vertical direction of the vehicle from the seat cushion 31.

The side air bag device 1 includes an inflator 2 serving as a gas injecting unit, and the side air bag member 10 that is arranged so as to be communicated with the inflator 2, and that expands with a gas injected from the inflator 2. The side airbag device 1 is configured to include a case, not illustrated, for storing the inflator 2 and the side air bag member 10.

In the embodiment, the inflator 2, the side air bag member 10, and the case are mounted to an unillustrated frame of the seat back 32 of the vehicle seat 30. A cover is provided to the frame for covering the frame. Specifically, the inflator 2, the side air bag member 10, and the case are accommodated in the seat back 32.

The side air bag device 1 also includes an unillustrated sensor for detecting a shock caused by aside impact on the side door 20. This sensor is connected to a control circuit not illustrated. The control circuit controls the inflator 2 based on a detection signal of the sensor.

Specifically, when the gas is injected into a later-described chamber 14, formed in the side air bag member 10, from the inflator 2 that is controlled by the control circuit, the side air bag device 1 starts to expand and develop the side air bag member 10.

The side air bag device 1 also includes an unillustrated inner tube that deflects the direction of the flow of the gas injected from the inflator 2 according to the expansion state of the side air bag member 10.

As described above, the side air bag device 1 according to the embodiment is arranged to the seat back 32 near the side door 20 in the widthwise direction of the vehicle, and expands the side air bag member 10 by the inflator 2 between the side door 20 and the passenger M, whereby a space can be secured between the side door 20 and the passenger M.

With this configuration, the side air bag device 1 prevents the passenger M from directly colliding against the side door 20 during the side impact on the side door 20, thereby protecting the passenger M from the shock caused by the side impact on the side door 20.

In the embodiment, the occupant protection device also includes the curtain air bag device 40, in addition to the side air bag device 1, in order to protect the passenger M from the shock caused by the side impact on the side door 20.

Like the side air bag device 1, the curtain air bag device 40 includes an unillustrated inflator serving as a gas injecting unit, and the curtain air bag member 42 that is arranged so as to be communicated with the inflator, and that expands with a gas injected from the inflator.

Like the side air bag device 1, the curtain air bag device 40 also includes a sensor for detecting a shock caused by the side impact on the side door 20, and a control circuit for controlling the sensor. They have the configurations same as those in the side air bag device 1, so that the description will not be described.

Specifically, when the gas is injected into a chamber, formed in the curtain air bag member 42, from the inflator that is controlled by the control circuit, the curtain air bag device 40 starts to expand and develop the curtain air bag device 40.

The curtain air bag device 40 is arranged along a front pillar inner or a side rail inner of the vehicle 5 located at the upper end of the side door 20, those of which are not illustrated. The curtain air bag device 40 expands the curtain air bag member 42 downward in the vertical direction of the vehicle.

The curtain air bag device 40 expands the curtain air bag member 42 in such a manner that the lower end of the curtain air bag member 42 in the vertical direction of the vehicle is located below a belt line L, which corresponds to the upper end of the side door 20.

Specifically, the curtain air bag device 40 expands the curtain air bag member 42 so as to cover the surface of the window glass 23, facing the compartment, of the side door 20. Therefore, the curtain air bag device 40 prevents the passenger M from being thrown from the vehicle by the shock caused by the side impact on the side door 20 during a rollover.

The curtain air bag device 40 expands the curtain air bag member 42 in such a manner that the lower end of the curtain air bag member 42 is located below the belt line L, which corresponds to the upper end of the side door 20. In other words, the curtain air bag device 40 expands the curtain air bag member 42 in such a manner that the lower end of the curtain air bag member 42 is overlapped with the upper end of the door trim 24.

Accordingly, even when the window glass 23 is broken, or the window glass 23 is opened, during the rollover, the curtain air bag member 42 of the curtain air bag device 40 is supported by the door trim 24. Consequently, this structure can prevent the curtain air bag member 42 from flying out of the vehicle.

Consequently, the curtain air bag device 40 has a function of preventing the passenger M from being thrown from the vehicle by the shock caused by the side impact on the side door 20 during the rollover, and of protecting a head of the passenger M with the curtain air bag member 42.

As described above, the curtain air bag device 40 according to the embodiment is arranged on the front pillar inner or the side rail inner along the longitudinal direction of the vehicle, and expands the curtain air bag member 42 between the side door 20 and the passenger M by the inflator, thereby protecting the passenger M from the shock caused by the side impact on the side door 20.

Here, the lower end of the curtain air bag member 42 in the vertical direction of the vehicle and the upper end of the side air bag member 10 may interfere with each other during the expansion. Specifically, the curtain air bag member 42 is configured to expand downward in the vertical direction of the vehicle from the front pillar inner or the side rail inner, as described above.

The curtain air bag device 40 according to the embodiment expands the curtain air bag member 42 in such a manner that the lower end of the curtain air bag member 42 is located below the belt line L, which corresponds to the upper end of the side door 20, in order to prevent the passenger M from being thrown from the vehicle by the shock caused by the side impact on the vehicle side wall.

On the other hand, the side air bag member 10 is configured to expand frontward in the longitudinal direction of the vehicle from the side of the seat back 32 as described above. The side air bag device 1 expands the upper end of the side air bag member 10 above the belt line L in order to protect the passenger M, especially, the shoulder of the passenger M, from the shock caused by the side impact on the vehicle side wall.

Therefore, the lower end of the curtain air bag member 42 in the vertical direction of the vehicle and the upper end of the side air bag member 10 may collide with each other during the expansion, which means they mutually inhibit the expansion to the appropriate position.

On the other hand, in the occupant protection device according to the embodiment, a first chamber 14a, described later, of the side air bag member 10 is displaced downward in the vertical direction of the vehicle by the pressing force of the curtain air bag member 42, in order to secure the appropriate expansion of the curtain air bag member 42 and the side air bag member 10.

Figure 3:
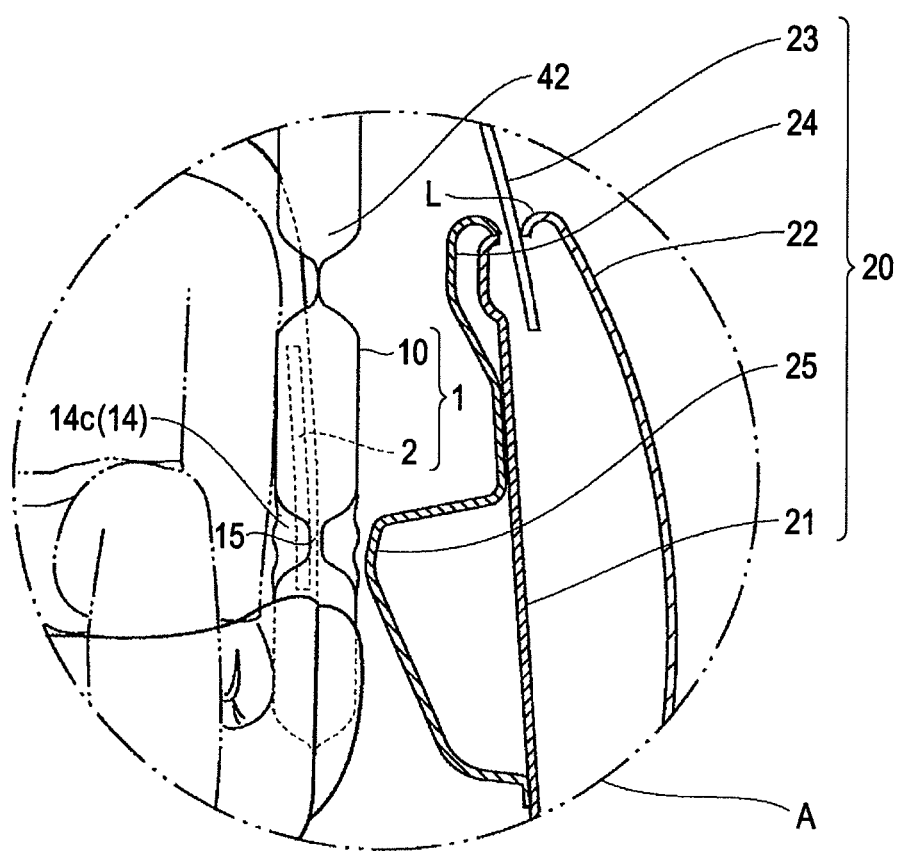
FIG. 3 is a front view illustrating an A portion in FIG. 1 as being enlarged.

Configurations of a communication chamber 14c, and a non-expanded portion 15 (collectively referred to as a contraction portion) for displacing the first chamber 14a of the side air bag member 10 downward in the vertical direction of the vehicle will be described with reference to FIGS. 3 to 5. FIG. 3 is a front view illustrating an A portion in FIG. 1 as being enlarged.

Figure 4:
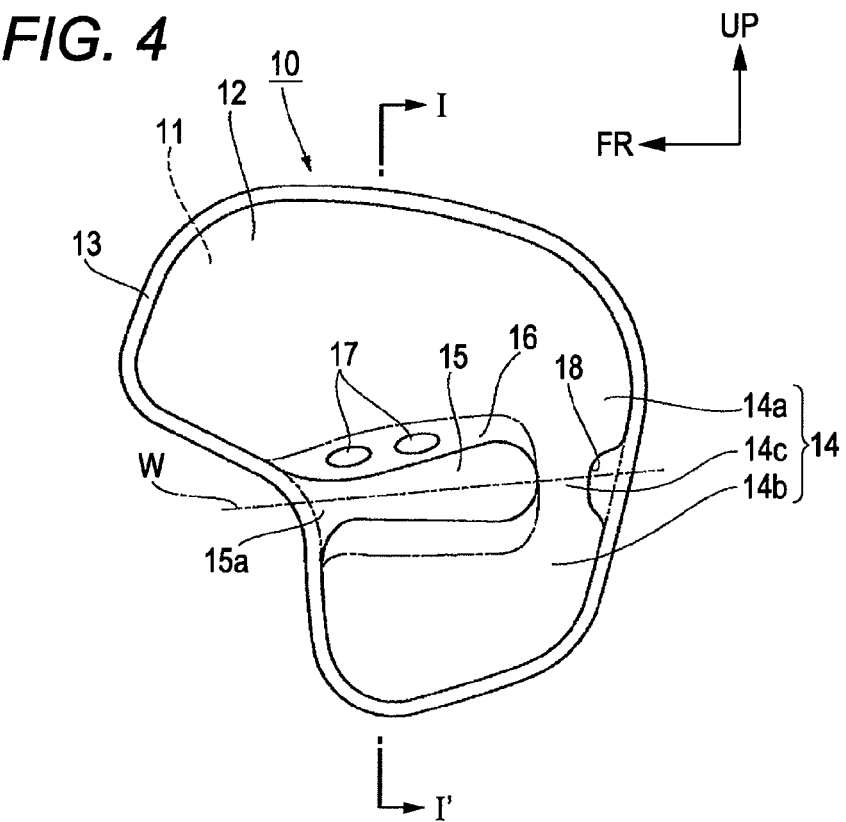
FIG. 4 is a side view schematically illustrating the configuration of the side air bag member of the side air bag device, according to one embodiment of the present invention, from a side in the widthwise direction of the vehicle.
Figure 5:
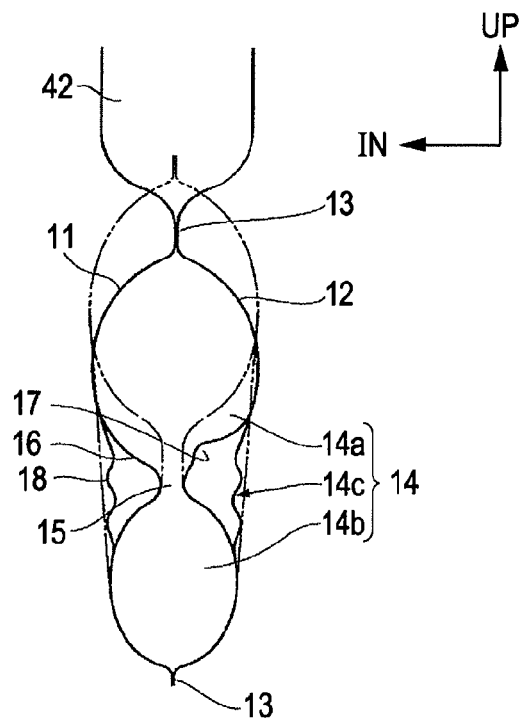
FIG. 5 is a schematic sectional view taken along a line I-I' in FIG. 4.

FIG. 4 is a side view schematically illustrating the configuration of the side air bag member 10, according to one embodiment of the present invention, from a side in the widthwise direction of the vehicle; and FIG. 5 is a schematic sectional view taken along a line I-I' in FIG. 4.

As illustrated in FIGS. 3 to 5, the side air bag member 10 according to the embodiment is formed into a bag-like shape by sewing a pair of ground fabrics made of a fireproofed woven fabric, for example.

Specifically, the side air bag member 10 includes an interior panel 11 located near the compartment in the widthwise direction, and an exterior panel 12 located near the outside of the vehicle so as to be opposite to the interior panel 11.

The side air bag member 10 also includes a sealing portion 13 for sealing the outer periphery of the interior panel 11 and the exterior panel 12. Specifically, the side air bag member 10 is formed into a bag-like shape, since the outer periphery of the interior panel 11 and the exterior panel 12 is sealed by the sealing portion 13.

In the embodiment, the sealing portion 13 seals the outer periphery of the interior panel 11 and the exterior panel 12 by sewing. The sealing portion 13 is not limited to be made by the sewing process, so long as it can seal the outer periphery of the interior panel 11 and the exterior panel 12. For example, the outer periphery of the interior panel 11 and the exterior panel 12 may be sealed by bonding or welding. The sealing portion 13 may seal with a tether that integrally forms the interior panel 11 and the exterior panel 12.

The side air bag member 10 formed into the bag-like shape is expanded and developed with the supply of the gas from the inflator 2. The side air bag member 10 includes the chamber 14 therein.

The side air bag member 10 also includes, in addition to the sealing portion 13, the non-expanded portion (shield portion) 15 that does not expand during the expansion of the side air bag member 10, since a part of the interior panel 11 and a part of the exterior panel 12 are sewn as being brought into contact with each other.

The non-expanded portion 15 is arranged almost at a center of the side air bag member 10, and is formed along the longitudinal direction of the vehicle, when the side air bag member 10 is viewed in the widthwise direction of the vehicle. Specifically, the chamber 14 has the first chamber 14a located above the non-expanded portion 15 and a second chamber 14b located below the non-expanded portion 15 across an axis W of the non-expanded portion 15 in the longitudinal direction of the vehicle.

The chamber 14 has a communication chamber 14c that is located on the axis W and allows the first chamber 14a and the second chamber 14b to be communicated with each other. As described above, the chamber 14 according to the present embodiment has formed therein the first chamber 14a, the second chamber 14b, and the communication chamber 14c with the supply of the gas from the inflator 2.

In the embodiment, the chamber 14 includes the non-expanded portion 15 that does not expand during the expansion as described above. Therefore, the chamber 14 forms a recessed portion 16 at the non-expanded portion 15 and in the vicinity of the outer periphery of the non-expanded portion 15.

Specifically, the gas is difficult to be supplied from the inflator 2 to the non-expanded portion 15 and the recessed portion 16, compared to the first chamber 14a and the second chamber 14b of the chamber 14, so that the non-expanded portion 15 and the recessed portion 16 are easy to be contracted with the pressing force of the curtain air bag member 42.

Accordingly, when the side air bag member 10 is pressed by the curtain air bag member 42, the non-expanded portion 15 and the recessed portion 16, especially the non-expanded portion 15, becomes the contraction portion, whereby the first chamber 14a can be displaced downward.

With this structure, the side air bag device 1 according to the embodiment displaces the first chamber 14a of the side air bag member 10 downward by the non-expanded portion 15, thereby being capable of easing the pressing force by the curtain air bag member 42.

In the embodiment, a front end 15a of the non-expanded portion 15 in the longitudinal direction of the vehicle is formed to be narrower than the other portion of the non-expanded portion 15 in the vertical direction of the vehicle. Therefore, the front end 15a is more difficult to be contracted than other portions, when pressed by the curtain air bag member 42.

On the other hand, the communication chamber 14c has a narrowed portion 18 formed by narrowing down the surface of the communication chamber 14c along the vertical direction of the vehicle. Therefore, the communication chamber 14c is easy to be contracted, when pressed by the curtain air bag member 42.

As described above, the communication chamber 14c and the non-expanded portion 15, which constitute the contraction portion of the side air bag member 10 according to the embodiment, can appropriately make an adjustment in such a manner that the portion easy to be contracted is made difficult to be contracted, and the portion difficult to be contracted is made easy to be contracted.

Consequently, when the first chamber 14a is displaced downward in the vertical direction of the vehicle since the side air bag member 10 is pressed by the curtain air bag member 42, the side air bag member 10 can positively contract the communication chamber 19c and the non-expanded portion 15.

Thus, when pressed by the curtain air bag member 42, the side air bag member 10 can contract the same portion, whereby the downward displacement of the first chamber 14a can be stabilized.

The side air bag member 10 includes a vent hole 17 formed for exhausting the gas, supplied into the chamber 14 from the inflator 2, to the outside. The vent hole 17 is formed on the first chamber 14a of the side air bag member 10.

Specifically, the side air bag member 10 has the vent hole 17 formed on the first chamber 14a, thereby exhausting the gas, supplied into the chamber 14 from the inflator 2, to the outside from the first chamber 14a.

The vent hole 17 is formed on the first chamber 14a, and in the recessed portion 16. The vent hole 17 is formed to be open downward in the vertical direction of the vehicle.

The side air bag member 10 is configured such that the first chamber 14a of the side air bag member 10 is displaced downward, when pressed by the curtain air bag member 42 as described above.

Therefore, the first chamber 14a of the side air bag member 10 receives the pressing force from above in the vertical direction of the vehicle by the curtain air bag member 42. Accordingly, since the side air bag member 10 has the vent hole 17 that is formed to be open downward that is the component direction of the pressing force by the curtain air bag member 42, the side air bag member 10 easily exhausts the gas with respect to the pressing force received from above.

Consequently, the side air bag member 10 according to the embodiment easily exhausts the gas in the chamber 14, when pressed by the curtain air bag member 42, thereby being capable of reducing the force of pushing back the curtain air bag member 42.

As described above, the side air bag member 10 has the vent hole 17 that is formed to be open downward, which makes it easy to exhaust the gas with respect to the pressing force received from above. Therefore, the side air bag member 10 reduces repelling force with respect to the pressing force by the curtain air bag member 42, i.e., eases the pressing force by the curtain air bag member 42.

The vent hole 17 is formed on the exterior panel 12 as described above. Specifically, the side air bag member 10 exhausts the gas, supplied into the chamber 14, from the exterior panel 12.

Therefore, the side air bag member 10 can prevent the gas from being exhausted toward the passenger M. Accordingly, the side air bag device 1 according to the embodiment can prevent the influence, such as a burn injury, to the passenger M, when expanding the side air bag member 10 due to the side impact. Consequently, the side air bag device 1 can enhance safety to the passenger M.

The vent hole 17 is formed to be open toward the non-expanded portion 15. Therefore, the gas can be exhausted to the space between the non-expanded portion 15 and the door trim 24. With this structure, the side air bag member 10 can be expanded without closing the vent hole 17 by the door trim 24.

The vent hole 17 according to the embodiment is formed to be open downward in the vertical direction of the vehicle as described above. However, as another embodiment, the vent hole may be formed to be open toward the front in the longitudinal direction of the vehicle.

In this case, the vent hole 17 may be formed at the front from the non-expanded portion 15 in the longitudinal direction of the vehicle. With this structure, the side air bag member 10 can be expanded without closing the vent hole 17 by the door trim 24.

As described above, the occupant protection device according to the embodiment allows the first chamber 14a of the side air bag member 10 to be displaced downward by the communication chamber 14c and the non-expanded portion 15 of the side air bag member 10, when the side air bag member 10 is pressed by the curtain air bag member 42, thereby being capable of easing the pressing force by the curtain air bag member 42.

Accordingly, when the side air bag member 10 is pressed by the curtain air bag member 42, the occupant protection device according to the embodiment can reduce the repelling force of the side air bag member 10.

Consequently, the occupant protection device according to the embodiment can expand the lower end of the curtain air bag member 42 below the belt line L of the side door 20, i.e., can expand the lower end of the curtain air bag member 42 to the appropriate position.

As described above, the occupant protection device according to the embodiment can expand the lower end of the curtain air bag member 42 to the appropriate position, thereby being capable of preventing the passenger M from being thrown from the vehicle due to the shock caused by the side impact on the side door 20.

Consequently, the occupant protection device according to the embodiment can enhance safety to the side impact on the side door 20, since it can prevent the passenger M from being thrown from the vehicle due to the shock caused by the side impact on the side door 20.

When the side air bag member 10 is pressed by the curtain air bag member 42, the occupant protection device according to the embodiment displaces the first chamber 14a of the side air bag member 10 downward by the communication chamber 14c and the non-expanded portion 15 of the side air bag member 10. Accordingly, the occupant protection device can expand the side air bag member 10 as preventing the reactive action of the side air bag member 10.

Therefore, even if the side air bag member 10 is pressed by the curtain air bag member 42, the occupant protection device according to the embodiment makes the side air bag member 10 difficult to repel, whereby the side air bag member 10 can be expanded to the appropriate position.

Even if the side air bag member 10 is pressed by the curtain air bag member 42, the occupant protection device according to the embodiment makes the side air bag member 10 difficult to repel, thereby being capable of preventing the side air bag member 10 to be cured upon the repelling.

As described above, since the occupant protection device according to the embodiment can prevent the side air bag member 10 from being cured, it can reduce the injury level to the passenger M. Accordingly, the occupant protection device according to the embodiment can enhance safety to the side impact on the side door 20, since the injury level to the passenger M is reduced.

What is claimed is:

1. A side air bag device that expands a side air bag member between a vehicle side wall and a passenger in a widthwise direction of a vehicle so as to protect the passenger from a shock caused by a side impact on the vehicle side wall, wherein
the side air bag member includes a contraction portion that is contracted when the side air bag member is pressed by a head protective air bag member that expands above the side air bag member in the vertical direction of the vehicle.

2. The side air bag device according to claim 1, wherein
the side air bag member comprises plural chambers including at least a first chamber located at an upper part in the vertical direction of the vehicle and a second chamber located at a lower part in the vertical direction of the vehicle, and
the contraction portion of the side air bag member is arranged between the first chamber and the second chamber in the vertical direction of the vehicle and includes a communication chamber that can communicate the first and second chambers, and a shield portion that shields the first and second chambers.

3. The side air bag device according to claim 2, wherein the shield portion has a predetermined length in the vertical direction and longitudinal direction of the vehicle.

4. The side air bag device according to claim 2, wherein the side air bag member has a narrowed portion formed on a part of an outer peripheral surface of the communication chamber along the vertical direction of the vehicle.

5. The side air bag device according to claim 3, wherein the side air bag member has a narrowed portion formed on a part of an outer peripheral surface of the communication chamber along the vertical direction of the vehicle.

6. The side air bag device according to claim 2, wherein the side air bag member has a vent hole formed on the first chamber.

7. The side air bag device according to claim 3, wherein the side air bag member has a vent hole formed on the first chamber.

8. The side air bag device according to claim 2, wherein the side air bag member has a vent hole formed on a front part from the contraction portion in the longitudinal direction of the vehicle.

9. The side airbag device according to claim 3, wherein the side air bag member has a vent hole formed on a front part from the contraction portion in the longitudinal direction of the vehicle.

10. The side air bag device according to claim 2, wherein the side air bag member has a vent hole formed in the vicinity of the shield portion and at the outer side in the widthwise direction of the vehicle.

11. The side airbag device according to claim 3, wherein the side air bag member has a vent hole formed in the vicinity of the shield portion and at the outer side in the widthwise direction of the vehicle.

12. An occupant protection device that expands a side airbag member and a head protective bag member between a vehicle side wall and a passenger in a widthwise direction of a vehicle so as to protect the passenger from a shock caused by an impact on the vehicle side wall, wherein the side air bag member includes a contraction portion that is contracted with a pressing force of the head protective bag member.

13. An occupant protection method comprising expanding a side air bag member and a head protective bag member between a vehicle side wall and a passenger in a widthwise direction of a vehicle so as to protect the passenger from a shock caused by an impact on the vehicle side wall, wherein
the side air bag member includes a contraction portion that is contracted when the side air bag member is pressed by a head protective air bag member that expands above the side air bag member in the vertical direction of the vehicle.

14. The occupant protection device according to claim 12, wherein
the side air bag member comprises plural chambers including at least a first chamber located at an upper part in the vertical direction of the vehicle and a second chamber located at a lower part in the vertical direction of the vehicle, and
the contraction portion of the side air bag member is arranged between the first chamber and the second chamber in the vertical direction of the vehicle and includes a communication chamber that can communicate the first and second chambers, and a shield portion that shields the first and second chambers.

15. The occupant protection device of claim 12 wherein the side air bag member has a vent hole formed in the vicinity of the contraction portion.

16. The occupant protection method of claim 13, wherein
expanding the side airbag member includes expanding plural chambers of the side airbag member including at least a first chamber located at an upper part in the vertical direction of the vehicle and a second chamber located at a lower part in the vertical direction of the vehicle, and
the contraction portion of the side air bag member is arranged between the first chamber and the second chamber in the vertical direction of the vehicle and includes a communication chamber that can communicate the first and second chambers, and a shield portion that shields the first and second chambers.

17. The occupant protection method of claim 16 further comprising venting of the side air bag member via a vent hole formed in the vicinity of the contraction portion.

* * * * *